United States Patent [19]

Jeanson et al.

[11] Patent Number: 4,611,821

[45] Date of Patent: Sep. 16, 1986

[54] EXTENSIBLE HITCHING DEVICE FOR ROAD AND RAIL VEHICLES

[76] Inventors: René H. Jeanson, Rue de la Cour, Auzay 85200 Fontenay Le Comte; Guy Lamothe, Rue Gallot, Fontenay Le Comte, both of France

[21] Appl. No.: 778,714

[22] Filed: Sep. 23, 1985

[30] Foreign Application Priority Data

Sep. 24, 1984 [FR] France .............................. 84 14608

[51] Int. Cl.⁴ ............................................ B62D 53/00
[52] U.S. Cl. ................................ 280/482; 280/476 R; 280/483; 280/432
[58] Field of Search ............... 280/482, 476 R, 476 A, 280/468, 491 A, 483, 408, 432

[56] References Cited

U.S. PATENT DOCUMENTS

| | | | |
|---|---|---|---|
| 2,771,306 | 11/1956 | Ash | 280/468 |
| 3,010,524 | 11/1961 | Ehley | 280/483 |
| 3,801,137 | 4/1974 | Zucca | 280/476 R |

Primary Examiner—John J. Love
Assistant Examiner—Donn McGiehan
Attorney, Agent, or Firm—Roylance, Abrams, Berdo & Goodman

[57] ABSTRACT

An extensible hitching device for road and rail vehicles is provided comprising a hydraulic actuator (4) having a cylinder (5), a piston (6), a piston rod (15) and a chamber (7) containing a hydraulic fluid; a coupling device (17) adapted for connection to the rear of another vehicle; resilient means urging the coupling device towards the other vehicle; a hydraulic circuit comprising a reservoir (25) connected to the chamber (7) through two ducts (26, 27), one comprising a normally closed valve (28) and the other a hydraulic pump (30); detection means for controlling opening of the valve (28) when the two vehicles, in the hitched position, form therebetween an angle greater than a given angle, and allowing the resilient means to cause the coupling device (17) to extend while driving back into the reservoir (25) the hydraulic fluid contained in the chamber (7) and control means for actuating the pump (30) so that the fluid driven thereby back into the chamber (7) causes the coupling device (17) to retract against the action of the resilient means.

17 Claims, 11 Drawing Figures

EXTENSIBLE HITCHING DEVICE FOR ROAD AND RAIL VEHICLES

The present invention relates to a vehicle comprising a chassis and an extensible hitching device whose front end is provided with a coupling device for connection to the rear of another vehicle.

In road units formed of a truck and trailer, these latter are generally spaced apart from each other by a distance greater than 1.4 meter so as to prevent them from colliding in bends. Now, since the length of these units must not exceed a maximum predetermined value, for example 18 meters in France, such spacing forms a considerable loss of useful volume since it is included in the maximum length permitted. It has the further disadvantage of promoting the formation of air turbulences between the truck and a trailer and of causing consequently not inconsiderable power losses.

Some constructors propose, it is true, extensible hitching devices allowing the distance separating the truck from its trailer to be reduced to 60 cm. These devices, the operation of which depends on the rotational movement of the front wheel unit of the trailer, generate however, in this unit very considerable transverse forces which cause abnormal wear of the tyres and may be dangerous for the stability of the road unit.

The present invention overcomes the different disadvantages mentioned above and, for this, it provides a vehicle which is characterized in that its hitching device comprises a hydraulic actuator comprising a cylinder, a piston, a piston rod and a chamber containing a hydraulic fluid; a hydraulic circuit comprising a reservoir connected to the chamber of the actuator through two ducts comprising one a normally closed valve and the other a hydraulic pump; resilient members urging the hitching device in the direction of the other vehicle; detection means for causing opening of the valve when the two vehicles, in the hitched position, form therebetween an angle greater than a given angle and causing the resilient members to drive the hitching device in the direction of the other vehicle while driving into the reservoir the hydraulic fluid contained in the chamber; and control means for actuating the hydraulic pump so that the hydraulic fluid driven back thereby into the chamber causes the coupling device to retract against the action of the resilient members.

With such a device, it is now possible to reduce the space between two hitched vehicles to about 20 or 30 cm, while preventing them from colliding in bends in the road. The turbulence phenomena and the corresponding power losses may therefore be limited to a maximum. The transverse forces generated by the extensible hitching devices constructed at the present time are moreover suppressed.

Preferably, the resilient members are formed by a pressurized gas contained in a cavity separated from the chamber by the piston and supplied with pressurized gas from a reserve.

The use of a pressurized gas for removing the coupling device in the direction of the head vehicle allows a perfectly reliable hitching device to be constructed.

In a particular embodiment of the invention, the cavity is situated between the piston and the rear end of the cylinder whereas the reserve is formed by an annular compartment situated between the cylinder and an external tube coaxial therewith.

The pressurized gas is therefore in this case stored about the cylinder of the hydraulic actuator, which allows the hitching device to be constructed in a compact and a consequently space saving form.

Advantageously, the piston rod is movable axially with respect to the cylinder and carries the coupling device and the piston respectively at its front and rear ends. Furthermore, the chamber is in front of the piston, which has at its rear end an axial extension forming a space with the rear end of the cylinder when the piston rod is completely withdrawn therein.

The presence of this space allows the pressurized gas to play a role of shock absorber when, with the piston rod completely withdrawn, the coupling device is subjected to an intense thrust force towards the head vehicle.

It is moreover desirable for the coupling device to be provided at its front end with a tenon fitted into the free end of the piston rod and comprising means for connecting it therewith in any one of several axially offset positions.

This solution has in fact the advantage of increasing the range of adjustment of the space separating the two hitched vehicles.

In another embodiment, the piston rod comprises the piston at its front end, whereas the cylinder, which is movable axially with respect thereto, is encased outwardly by a cylindrical casing slideably mounted in an external tube coaxial with the actuator rod, the casing being secured to the front end of the cylinder and closed at its front end by a front wall comprising the coupling device.

In this embodiment, the chamber is at the rear of the piston, said chamber being formed by an axial channel formed in the piston rod and by an annular chamber formed between the piston rod and the cylinder. Moreover, the cavity is situated between the piston and the front end of the cylinder whereas the reserve is formed by an annular compartment extending between the cylinder and the casing and possibly between the piston rod and the external tube and by two pressurized gas reservoirs.

To compensate for leaks which might possibly occur, the reserve advantageously comprises means for connecting it to a pressurized gas source installed on the ground and/or on the vehicle.

In the case where the pressurized gas is compressed air, the reserve could of course comprise a valve for allowing it to be connected to compressors available in all garages, or be permanently connected, through a duct having a non return valve, to the compressed air reservoir provided on the vehicle.

In accordance with another feature of the invention, the hitching device is in the form of a triangulated beam comprising an axial element formed by the hydraulic actuator and the external tube.

The structure of the hitching device having this feature is particularly robust, which removes any risk of failure and consequently of accidents.

In so far as the hydraulic circuit is concerned, it comprises a safety valve mounted in parallel with the normally closed valve.

When the head vehicle subjects the hitching device to a tractive force whose intensity is greater than the calibrated pressure of the safety valve, this latter opens so as to allow a part of the fluid contained in the annular chamber of the hydraulic actuator to return to the reservoir and so may play the role of a hydraulic shock absorber.

When the vehicle comprises a front unit mounted on wheels, a ball bearing ring having a fixed part secured to the chassis and a rotary part secured to the front unit, the detection means comprise preferably a support mounted on the chassis of said vehicle for pivoting about an axis perpendicular to the longitudinal axis thereof; a plate directed upwardly and forming a given angle with the vertical when the two vehicles are aligned, the lower end of this plate being secured to the support whereas its upper end comprises a transverse rod in contact with the rear of the other vehicle; a horizontal arm one of the ends of which is articulated to the support and the other end of which comprises a guide roller bearing against a circular surface integral and coaxial with the rotary part of the ball bearing ring of the front unit, this arm being situated on the longitudinal axis of said vehicle and movable along this axis; means for returning the transverse rod against the rear of the other vehicle and linkage interposed between the arm and the valve for opening this latter when the plate forms with the vertical an angle less than the given angle.

With this particular construction, opening of the valve may be provided whenever the two vehicles negociate a curve in one or the other direction. In a bend, the head vehicle in fact forces the transverse rod to come closer to the towed vehicle and forces the support to pivot in the direction causing a reduction of said given angle, i.e. in the direction permitting opening of the valve.

Advantageously, the circular surface comprises two projections positioned so as to come against the guide roller as soon as the hitching device forms in one or the other direction an angle of the order of 20° with the longitudinal axis of said vehicle.

Thus, when the projections come in front of the guide roller, the horizontal arm moves forwardly and so causes the support to pivot so that the transverse rod comes against the front transverse side of the towed vehicle where it does not risk being accidently damaged in very short bends.

Preferably, the support comprises a lug adapted for actuating the means controlling the hydraulic pump when the plate forms with the vertical an angle greater than the given angle.

In a particular embodiment of the invention, the means for controlling the hydraulic pump comprise an arm rotatably supporting a shaft on which are fixed the drive shaft of the hydraulic pump and a roller parallel to and adjacent one of the wheels of the front unit, a pneumatic actuator whose piston rod is articulated to the arm for moving it between an active position in which it applies the roller against the wheel and an inactive position in which it moves it away therefrom, a pneumatic circuit comprising a duct connecting the bottom side chamber of the pneumatic actuator to a two-position electro-distributor connected to a compressed air source and a switch for actuating the electro-distributor so that it connects the bottom side chamber to the atmosphere when the piston rod of the hydraulic actuator is completely retracted and so that it connects it to the compressed air source when the piston rod of the hydraulic actuator is not completely retracted.

In this case, the hydraulic pump is therefore only actuated if the two vehicles move and form an angle therebetween, which reduces the risks of wear and forms a safety precaution of the staff charged with maintenance.

Advantageously, the rod side chamber of the penumatic actuator comprises a spring urging the arm into its inactive position when the bottom side chamber is connected to the atmosphere. The arm is thus returned to its inactive position in a simple and automatic way.

One embodiment of the present invention will be described hereafter by way of example, which is in no wise limitative, with reference to the accompanying drawings in which.

Figures 1, 2:
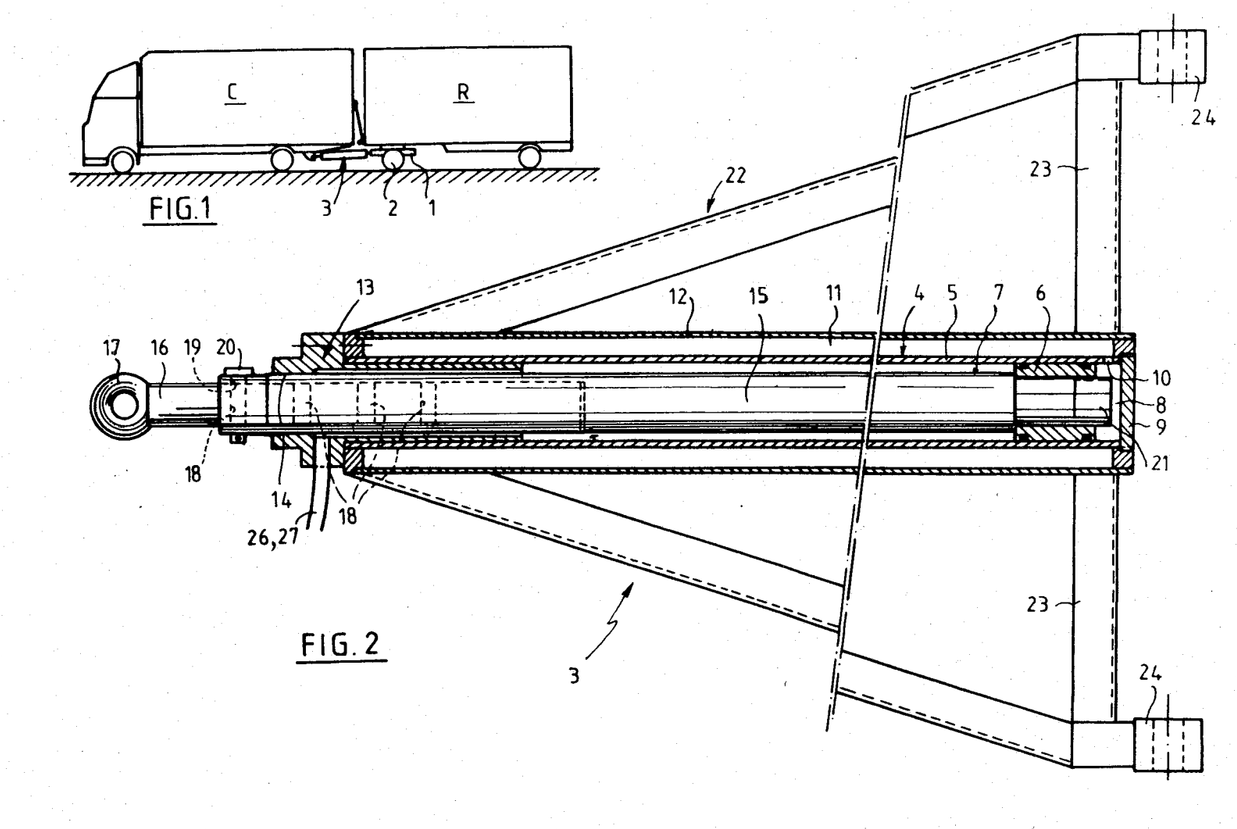
FIG. 1 is a side view of a road unit formed of a truck and a trailer equipped with a hitching device in accordance with the invention.
FIG. 2 is a partial top view of the hitching device of the trailer shown in FIG. 1.

The road unit which can be seen in FIG. 1 is formed of a truck C to the rear of which is hitched a trailer R comprising an orientatable front wheel unit 1 having wheels 2 and an extensible hitching device 3 in accordance with the invention.

This hitching device allows the front of the trailer to be held at about 30 cm from the rear of the truck when the road assembly moves in a straight line. It further allows the spacing between the truck and the trailer to be automatically increased when they form a given angle therebetween, so as to prevent them from colliding in bends.

As can be seen in FIG. 2, the hitching device 3 comprises first of all a hydraulic actuator 4 whose cylinder 5 is divided by a piston 6 into an annular front chamber 7 containing a hydraulic fluid such as oil and a rear chamber or cavity 8 containing a pressurized gas such as air or nitrogen.

The rear end of cylinder 5 is closed by a plug 9 and comprises orifices 10 causing the rear chamber 8 to communicate with an annular compartment or reserve 11 formed between the cylinder 5 and an external tube 12 disposed coaxially therewith. The front end of the cylinder is closed by a piece 13 partially inserted into the front chamber 7, this piece forming a bearing 14 for the piston rod 15 of actuator 4.

The free end of piston rod 15 comprises a blind hole in which is inserted a tenon 16 ending in a hitching ring 17 intended to cooperate with a hook (not shown) provided on the truck. Tenon 16 comprises several parallel bores 18, four in the example shown, capable of being aligned selectively with a bore 19 provided at the free end of the piston rod 15, so as to allow a pin 20 to pass therethrough. It will be readily understood that the length of the projection part of the tenon may be modified by fitting pin 20 into bore 19 and one of bores 18.

It will be noted here that piston 6 has at its rear end an axial extension 21 spaced slightly apart from plug 9 when the piston rod 15 is completely retracted into cylinder 5. Thus, the pressurized fluid contained in the rear chamber 8 forms a pneumatic shock absorber when, with the piston rod in its completely retracted position, the truck exerts an intense thrust force on the trailer.

It will also be noted that actuator 4 and tube 12 form the axial element of a triangulated hitching beam 22 whose transverse rear end 23 comprises two connecting sleeves 24 intended to be retained between the legs of two fork joints (not shown) secured to the rotary part of the ball bearing ring (known per se) of the front wheel unit 1 of the trailer.

Figures 3, 4, 5:
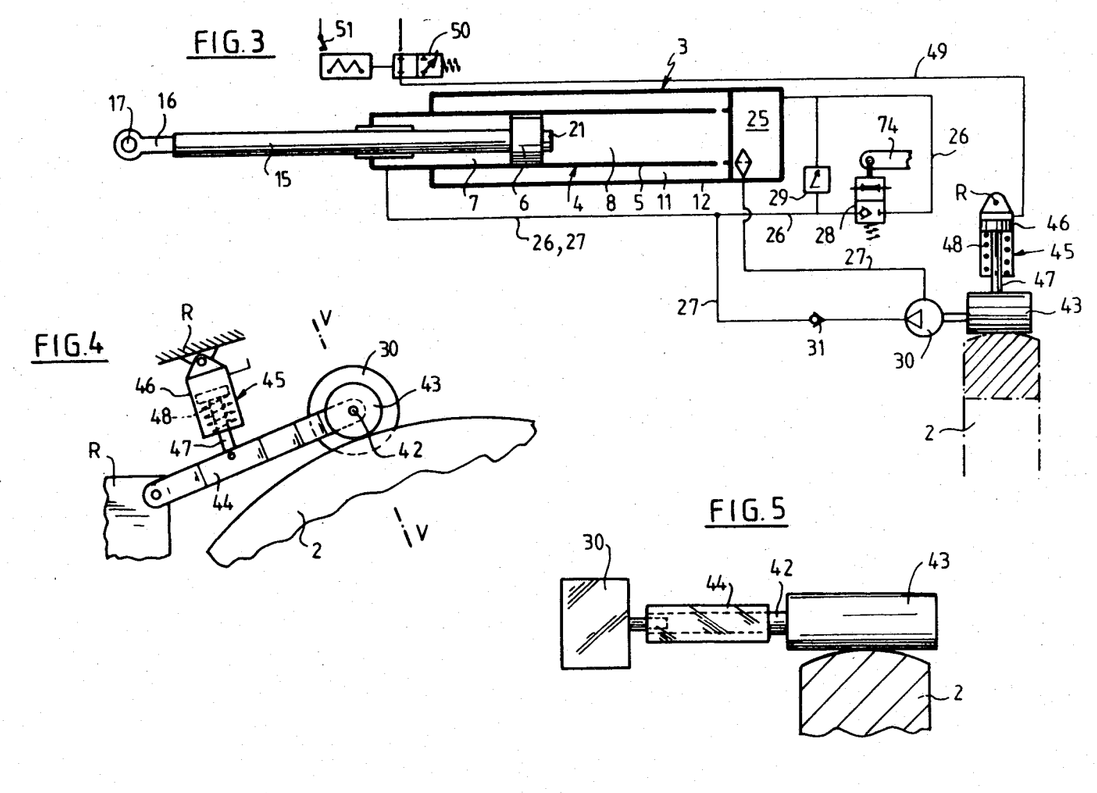
FIG. 3 is a schematical view showing the hydraulic circuit and a means for controlling the pump of the hydraulic circuit.
FIG. 4 is a schematical side view showing the arm, the actuator and the roller of the means controlling the hydraulic pump.
FIG. 5 is a view through line V—V of FIG. 4.

As shown moreover in FIG. 3, hitching device 3 also includes a hydraulic circuit comprising a reservoir 25 connected to the front chamber 7 of cylinder 5 through two ducts 26, 27, the first one comprising a normally closed valve 28 and a safety valve 29 mounted in parallel with valve 28, whereas the second comprises a hydraulic pump 30 and a non return valve 31.

It should be mentioned here that the safety valve 29 forms a hydraulic shock absorber by opening when the truck exerts on the trailer a tractive force greater than its calibrated pressure.

When the normally closed valve 28 is opened, the pressurized gas contained in the rear chamber 8 and compartment 11 drives into reservoir 25 the hydraulic fluid contained in the front chamber 7 and thus causes the piston rod 15 to extend. But when pump 30 is actuated, it drives fluid into the front chamber and causes the piston rod 15 to retract against the action of the pressurized gas.

With reference in particular to FIGS. 4 and 5, it can be seen that the drive shaft of the hydraulic pump 30 is fixed to one of the ends of a shaft 42 comprising a roller 43 at its other end. Shaft 42 is mounted for rotation at one of the ends of an arm 44 whose other end is articulated to the trailer. As for roller 43, it is parallel to and adjacent the tread of one of the wheels 2 of the front wheel unit of the trailer.

A pneumatic actuator 45 whose cylinder 46 and piston 47 are respectively articulated to the trailer and to arm 44 is provided for causing this latter to pivot between an active position in which it applies roller 43 against wheel 2 and an inactive position in which it moves it away therefrom.

As can moreover be seen in FIG. 3, the rod side chamber of actuator 45 comprises a helical spring 48 for returning arm 44 to its inactive position, whereas the bottom side chamber is connected by a duct 49 to a two position electro-distributor 50, this latter being itself connected to a compressed air source (not shown) and capable of being energized through a position switch 51.

When switch 51 is closed, the slide valve of the electro-distributor 50 connects the bottom side chamber of the pneumatic actuator 45 to the compressed air source. The piston rod 47 then extends from cylinder 46 progressively as the compressed air fills the bottom side chamber and, thus moves arm 44 to its active position so as to allow roller 43 to come against wheel 2. Providing of course that the trailer is moving, the roller is driven by wheel 2 as soon as it comes into contact therewith, and thus in its turn drives pump 30 which may then drive the hydraulic fluid back into the front chamber 7 of the hydraulic actuator 4 so as to retract the piston rod 15 of this latter.

On the other hand, when switch 51 is open, the slide valve of the electro-distributor 50 connects the bottom side chamber of the pneumatic actuator 45 to the atmosphere, whereas spring 48 causes the piston rod 47 to retract into cylinder 46 and brings arm 44 back to its inactive position. Roller 43, no longer in contact with wheel 2, therefore ceases to drive pump 30.

The method of driving the hydraulic pump 30 could of course be different from the one shown in FIGS. 3 to 5. Thus, it would still be within the scope of the present invention to use the engine of the truck for permanently driving the hydraulic pump and an electrovalve controlled by switch 51 for sending the hydraulic fluid into the front chamber 7 of actuator 4.

Similarly, roller 43 could be held permanently against wheel 2 under the action of a spring replacing the pneumatic actuator 45, the hydraulic circuit being in this case further provided with an electro-valve controlled by switch 51.

The pneumatic actuator 45 could also be replaced by an electro-magnet energized by switch 51 against the action of a return spring.

The detection means shown in FIGS. 6 to 9 will now be described.

Figure 7:
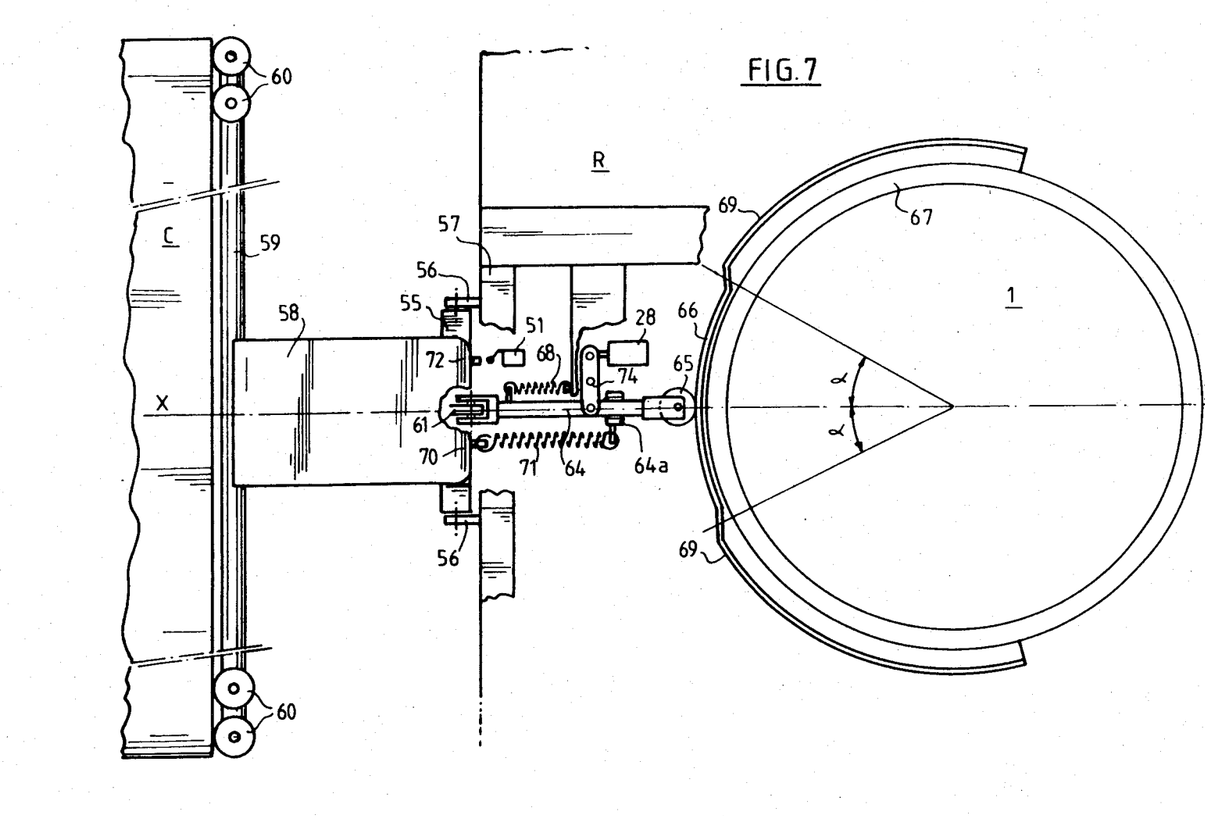
FIG. 7 is a schematical top view with parts cut away showing the detection means represented in FIG. 6.
Figure 8:
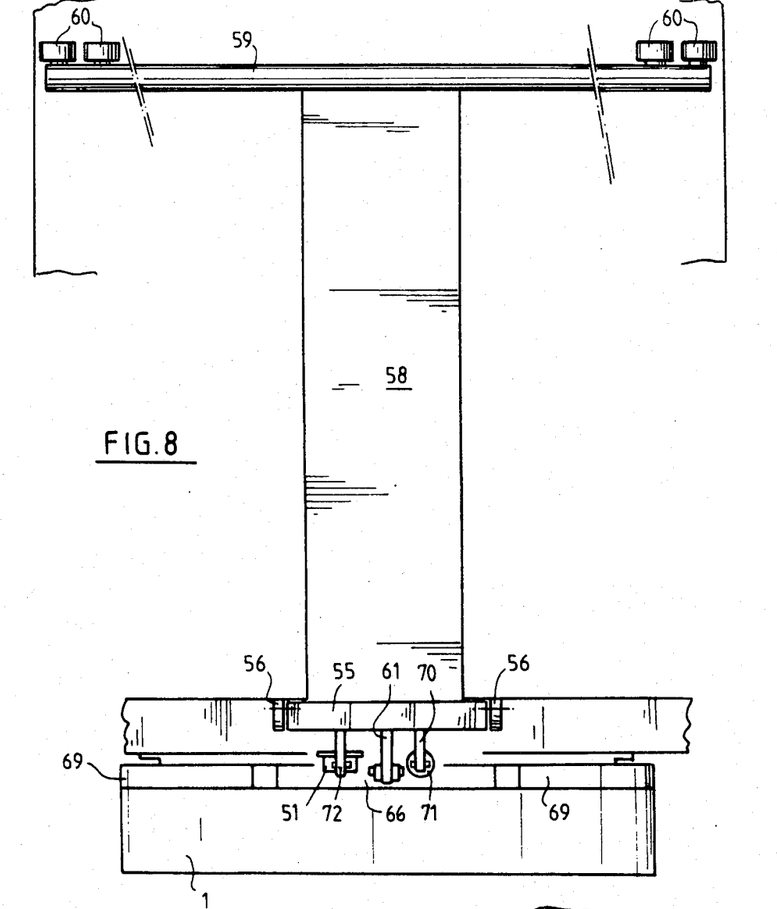
FIG. 8 is a view through line VIII—VIII of FIG. 6.

These means comprise a support 55 resting on two bearings 56 fixed to the front transverse side of chassis 57 of trailer R, at equal distances from the longitudinal axis XX' thereof (see in particular FIG. 7).

An upwardly directed plate 58 fixed by its lower end to support 55 ends in a transverse rod 59 parallel to the rear transverse side of the truck, this rod comprising at both ends (which extend substantially as far as the facing vertical sides of the truck and of the trailer) rollers 60 for limiting the friction forces of rod 59 against the rear of the truck during movement of the road unit.

Figure 9:
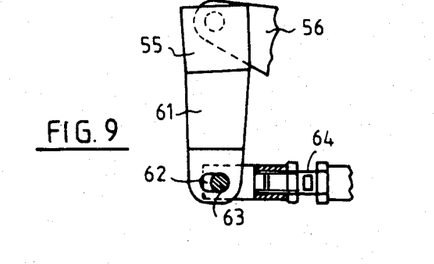
FIG. 9 is an enlarged view showing the connection between the support and the horizontal arm of FIGS. 6 to 8.

A lug 61 situated on the longitudinal axis XX' of the trailer is fixed to the lower face of support 55. As shown in FIG. 9, this lug is provided at its free end with an oblong opening 62 receiving a shaft 63 carried by the front end of a horizontal arm 64 whose rear end is provided with a guide roller 65 (see FIG. 9). Arm 64 is guided in a bearing 64a integral with chassis 57 whereas roller 65 bears against a circular surface 69 integral and coaxial with the rotary part of the ball bearing ring 67 (known per se) of the front wheel unit 1 and is held against surface 66 by a spring 68 stretched between arm 64 and chassis 57 of the trailer.

The circular surface 66 comprises two projections 69 each forming an angle α with the longitudinal axis of the trailer when the truck and the trailer are aligned, and whose function will be clear from the description given hereafter.

On its lower face, support 55 comprises a second lug 70 connected to the chassis 57 of the trailer by means of a spring 71, shown in FIG. 7. Under the action of this spring, support 55 is therefore urged in the direction of arrow F, shown in FIG. 6.

Figure 6:
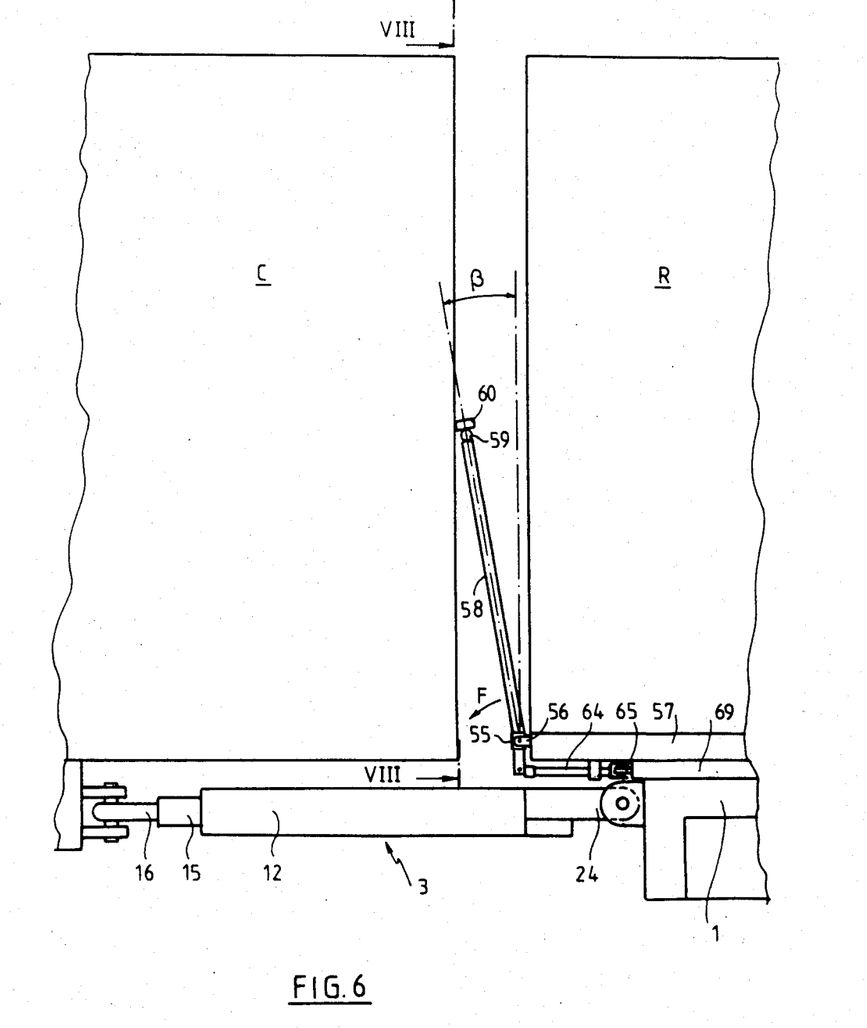
FIG. 6 is a schematical side view showing the rear of the truck, the front of the trailer and the detection means of the hitching device thereof.

Support 55 also comprises, still on its lower face, a third lug 72 positioned in the vicinity of the position switch 51 which was discussed above.

A lever 74 mounted for pivoting on chassis 57 of the trailer and articulated to the arm 64 by one of its ends is further provided for actuating the normally closed valve 28 when arm 64 is moved axially.

The mode of operation of the detection means discussed above will now be described.

When truck C and trailer R are aligned, plate 58 forms with the normal the angle $\beta$ shown in FIG. 6. During this time, switch 51 and the normally closed valve 28 are not actuated and the piston rod 15 of the hydraulic actuator remains in its retracted position. Let us now assume that the truck and the trailer form an angle therebetween. Under the action of rollers 60 which bear against the rear transverse side of the truck, the angle $\beta$ formed by plate 58 with the normal decreases and support 55 pivots against the action of spring 71 in the direction opposite that of arrow F, which forces arm 64 to move axially in the direction of the truck. Lever 74 then opens the normally closed valve 28 which allows the piston rod 15 of the hydraulic actuator to extend.

Then, as the distance between the truck and the trailer increases, the angle formed by plate 58 with the vertical again becomes equal to angle $\beta$ and lever 74 closes valve 28 again.

It can thus be seen that lengthening of the hitching device depends on the size of the angle formed by the truck and the trailer.

Let us now suppose that the truck and the trailer, after having been moved away from one another, become aligned again. Since spring 71 urges the support in the direction of arrow F, the angle formed by plate 58 with the normal becomes in this case greater than the angle $\beta$. In the limit of the free movement provided by the oblong opening 62 (FIG. 9), support 55 then pivots until the third lug 72 closes switch 51. As soon as this latter is closed, the electro-distributor 50 feeds compressed air into the bottom side chamber of the pneumatic actuator 45, which allows roller 43 to come against wheel 2 and drive pump 30 which then causes the piston rod 15 of the hydraulic actuator 4 to retract until the angle formed by plate 58 with the normal again becomes equal to angle $\beta$.

When the hitching device 3 pivots through an angle greater than the angle $\alpha$, shown in FIG. 7, one of the projections 69 which are integral with the rotary part of the ball bearing ring of the front wheel unit comes in front of roller 65 and forces arm 64 to move in the direction of the truck. During this time, support 55 pivots in the direction opposite that of arrow F, until plate 58 and the transverse rod 59 come practically against the front transverse side of the trailer.

Application of plate 58 and rod 59 against the front of the trailer is indispensable in very sharp curves. When negociating such curves it may in fact happen that the rear of the truck is no longer in front of the front transverse side of the trailer and can no longer serve as abutment for the plate and the rod. In this case, they would be free and would slant forwardly, but would risk being damaged by the truck when it comes back into alignment with the trailer.

Figures 10, 11:
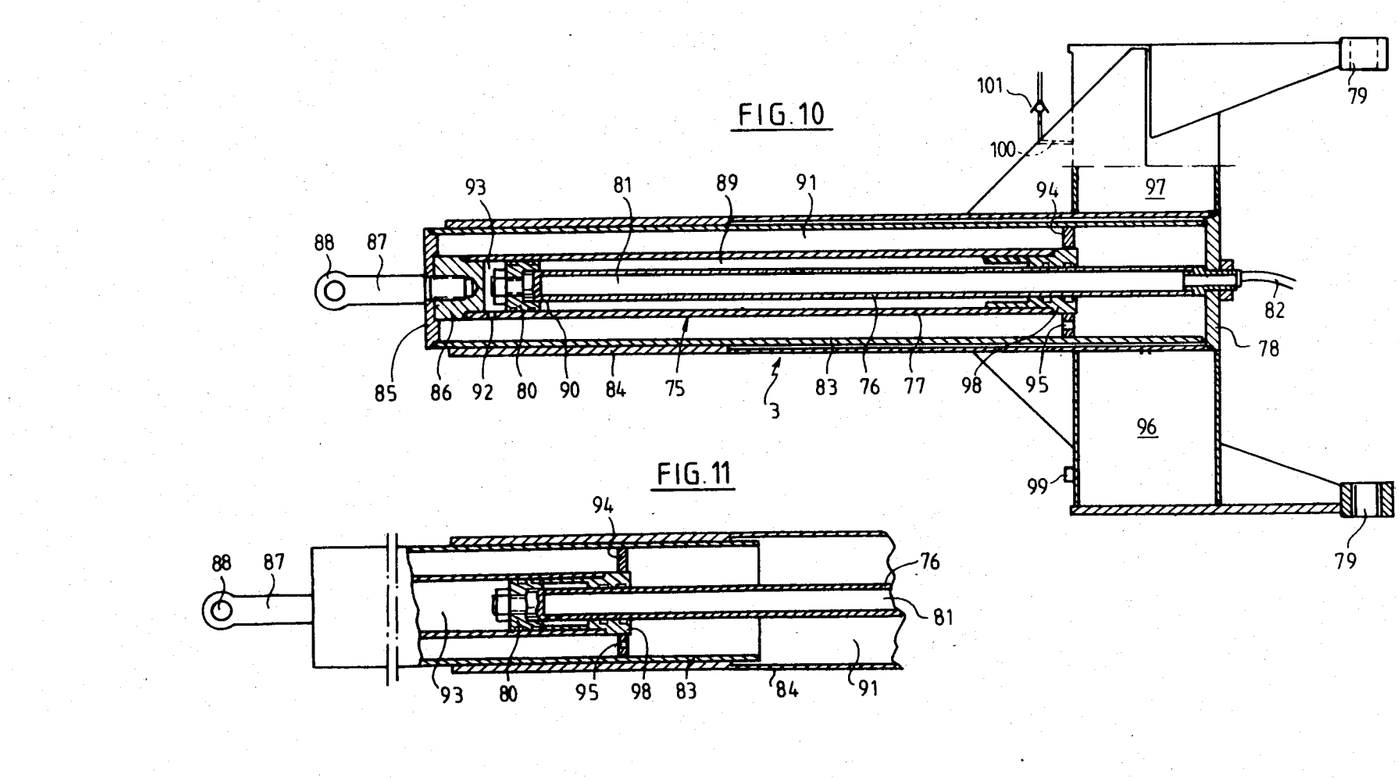
FIG. 10 is a longitudinal sectional view showing a variant of construction of the hydraulic actuator, the cylinder of the actuator in this variant being in its retracted position.
FIG. 11 is a view similar to that of FIG. 10, showing partially the cylinder of the actuator in its projecting position.

In the embodiment shown in FIGS. 10 and 11, the hitching device 3 comprises a hydraulic actuator 75 whose piston rod 76 is fixed and whose cylinder 77 is movable axially along the piston rod 76.

The piston rod 76 is connected by its rear end to a transverse beam 78 comprising two sleeves 79 for connecting it to the rotary part of the ball bearing ring of the front wheel unit of the trailer. It is further provided with a piston 80 at its front end and an axial channel 81 whose rear end is connected through a duct 82 to the hydraulic circuit shown in FIG. 3.

As for cylinder 77, it is encased outwardly by a cylindrical casing 83 mounted for sliding in an external tube 84 coaxial with the piston rod 76, this tube being secured to beam 78 and perpendicular therewith.

At its front end, casing 83 is closed by a front wall 85 connected to the front end of cylinder 77 through a connecting piece 86.

A tenon 87 ending in a coupling ring 88 projects from the front wall 85 for coupling the trailer to the rear of a truck.

Piston rod 76 and cylinder 77 form therebetween an annular chamber 89 communicating with the front end of channel 81 through bores 90 formed in the wall of the piston rod. When the piston rod 76 is completely retracted into the cylinder, this latter forms with casing 83 an annular compartment 91 whose front end communicates, through bores 92 formed in cylinder 77, with a chamber 93 extending between piece 86 and piston 80.

Compartment 91 comprises an annular wall 94 with bores 95 and communicates with two compressed air reservoirs 96, 97, extending on each side of the outer tube 84, along beam 78. When the piston rod 76 is partially or completely extended from the cylinder, compartment 91 extends between piston rod 76 and the outer tube 84 (see FIG. 11).

It will be noted here that the annular wall 94, which is integral with casing 83 and with an annular plug 98 closing the rear end of cylinder 77, forms a reinforcement element for the hydraulic actuator 75.

It will also be noted that compartment 91, chamber 93 and reservoirs 96, 97 preferably contain compressed air under a relatively low pressure, reservoirs 96, 97 comprising a valve 99 for connecting them to the compressed air accumulators available in all garages, as well as a duct 100 provided with a non return valve 101 for connecting them to the compressed air reservoir (not shown) of the trailer.

Operation of the hydraulic actuator 75 is obvious and has not been described here. It will be simply pointed out that when lever 74 (FIG. 7) opens valve 28, the compressed air contained in compartment 91, chamber 93 and reservoirs 96, 97 moves cylinder 77, casing 83 and tenon 87 in the direction of the truck while driving the hydraulic fluid contained in the axial channel 81 and the annular chamber 89 back into the reservoir 25 (FIG. 3) of the hydraulic circuit.

On the other hand, when the hydraulic pump 30 is actuated, it drives hydraulic fluid into the axial channel 81 and the annular chamber 89, thus causing cylinder 77 to retract on piston rod 76 against the action of the compressed air.

For the sake of completeness, it will be mentioned that seals are provided between the piston rod 76 and plug 98 provided at the rear end of cylinder 77, as well as between casing 83 and the front end of the outer tube 84.

It will also be noted that the compressed air used for urging the tenon 87 in the direction of the truck could be replaced by a compressed spring extending between cylinder 77 and casing 83 and whose ends would bear respectively against the front wall 85 and beam 78.

In the foregoing, two embodiments have been described for an extensible hitching device connecting a trailer to the rear of a truck. It goes without saying that modifications of a secondary order could be made to these embodiments for connecting a semi trailer to a tractor without departing from the scope and spirit of the invention.

It should also be understood that nothing prevents the hitching devices of the present invention from being used for connecting rail vehicles together.

We claim:

1. A vehicle comprising a chassis (57) and an extensible hitching device (3) whose front end is provided with a coupling device (17;88) adapted to be connected to the rear of another vehicle, characterized in that the hitching device (3) comprises a hydraulic actuator (4;75) comprising a cylinder (5;77), a piston (6;80) a piston rod and a chamber (7;81,89) containing a hydraulic fluid; a hydraulic circuit comprising a reservoir (25) connected to the chamber (7;81,89) of the actuator (4;75) through two ducts (26,27) comprising one a normally closed valve (28) and the other a hydraulic pump (30); resilient means urging the coupling device (17;88) in the direction of the other vehicle; detection means for controlling the opening of the valve (28) when the two vehicles, in the hitched position, form therebetween an angle greater than a given angle and allow the resilient means to extend the coupling device (17;88) in the direction of the other vehicle while driving back into the reservoir (25) the hydraulic fluid contained in the chamber (7;81,89); and control means for actuating the hydraulic pump (30) so that the hydraulic fluid driven back into the chamber (7;81,89) causes the coupling device (17;88) to retract against the action of the resilient means.

2. Vehicle according to claim 1, characterized in that the resilient means are formed by a pressurized gas contained in a cavity (8;93) separated from the chamber (7;81,89) by the piston (6;80) and fed with pressurized gas from a reserve (11;91,96,97).

3. Vehicle according to claim 2, characterized in that the cavity (8) is situated between the piston (6) and the rear end of the cylinder (5) whereas the reserve (11) is formed by an annular compartment (11) situated between the cylinder (5) and an outer tube (12) coaxial therewith.

4. Vehicle according to claim 1, characterized in that the piston rod (15) is movable axially with respect to the cylinder (5) and comprises the coupling device (17) and the piston (6) respectively at its front and rear ends, the chamber (7) being in front of the piston.

5. Vehicle according to claim, characterized in that the piston (6) comprises at its rear end an axial extension (21) forming a space with the rear end of the cylinder (5) when the piston rod (15) is completely retracted therein.

6. Vehicle according to claim 1, characterized in that the coupling device (17) is provided at the front end of a tenon (16) fitted into the free end of the piston rod (15) and comprising means (18) for connecting it thereto in any one of several axially offset positions.

7. Vehicle according to claim 1, characterized in that piston rod (17) comprises the piston (80) at its front end whereas the cylinder (77), which is movable axially with respect thereto, is encased outwardly by a cylindrical casing (83) slidably mounted in an outer tube (84) coaxial with the actuator rod (76), the casing (83) being integral with the front end of the cylinder (77) and closed at its front end by a front wall (85) supporting the coupling device (88), the chamber (81,89) being at the rear of the piston (80).

8. Vehicle according to claim 7, characterized in that the chamber (81,89) is formed by an axial channel (81) formed in the piston rod (76) and by an annular chamber (89) formed between the piston rod (76) and the cylinder (77).

9. Vehicle according to claim 3, characterized in that the cavity (93) is situated between the piston (30) and the front end of the cylinder (77) whereas the reservoir (91,96,97) is formed by an annular compartment extending between the cylinder (77) and the casing (83) and positioned between the piston rod (76) and the outer tube (84) and by two reservoirs (96,97).

10. Vehicle according to claim 9, characterized in that the reservoirs (96,97) comprise means (99,100,101) for connecting them to a pressurized gas source installed on the ground and/or on the vehicle.

11. Vehicle according to claim 1, characterized in that the hitching device (3) is in the form of a triangulated beam comprising an axial element formed by the hydraulic actuator (4;75) and the outer tube (12;84).

12. Vehicle according to claim 1, characterized in that the hydraulic circuit comprises a safety valve (29) mounted in parallel with the normally closed valve (28).

13. Vehicle according to claim 1, comprising a front wheel unit (1) mounted on wheels (2), a ball bearing ring (67) having a fixed part secured to the chassis (57) and a rotary part secured to the front wheel unit (1), characterized in that the detection means comprise a support (55) mounted for pivoting on the chassis (57) of said vehicle, about an axis perpendicular to the longitudinal axis (XX') thereof; a plate (58) directed upwardly and forming a given angle ($\beta$) with the vertical when the two vehicles are aligned, the lower end of this plate (58) being secured to the support (55), whereas its upper end supports a transverse rod (59) in contact with the rear of the other vehicle; a horizontal arm (64) one of whose ends is articulated to the support (55) and the other end of which comprises a guide roller (65) bearing against a circular surface (66) integral and coaxial with the rotary part of the ball bearing ring (67) of the front wheel unit (1), this arm (64) being situated on the longitudinal axis (XX') of said vehicle and movable along this axes; means (71) for returning the transverse rod (59) against the rear of the other vehicle; and a linkage (74) interposed between the arm (64) and the valve (28) for opening this latter when the plate (58) forms with the vertical an angle less than the given angle ($\beta$).

14. Vehicle according to claim 13, characterized in that the circular surface (66) comprises two projections (69) positioned so as to come against the guide roller (65) as soon as the hitching device (3) forms in one or other direction an angle of the order of 20° with the longitudinal axis (XX') of said vehicle.

15. Vehicle according to claim 13, characterized in that the support (55) comprises a lug (72) adapted for actuating the means controlling the hydraulic pump (30) when the plate (58) forms with the vertical an angle greater than the given angle $\alpha$.

16. Vehicle according to claim 13, characterized in that the means controlling the hydraulic pump comprise an arm (44) rotatably supporting a shaft (42) on which are fixed the drive shaft of the hydraulic pump (30) and a roller (44) parallel to and adjacent one of the wheels (2) on the front wheel unit (1), a pneumatic actuator (45) whose piston rod (47) is articulated to the arm (44) for moving it between an active position in which it applies the roller (43) against the wheel (2) and an inactive position in which it is moved away therefrom, a pneumatic circuit comprising a duct (49) connecting the bottom side chamber of the pneumatic actuator (45) to a two position electro-distributor (50) connected to a compressed air source, and to a switch (51) for actuating the electro-distributor (50) so that it connects the bottom side chamber to the atmosphere when the piston rod (15;76) of the hydraulic actuator (4;75) is completely retracted and so that it connects it to the compressed air source when the piston rod (14;76) of the hydraulic actuator (4;75) is not completely retracted.

17. Vehicle according to claim 16, characterized in that the rod side chamber of the pneumatic actuator (45) comprises a spring (48) urging the arm (44) into its inactive position when the bottom side chamber is connected to the atmosphere.

* * * * *